United States Patent [19]

Renk

[11] Patent Number: 4,971,702

[45] Date of Patent: Nov. 20, 1990

[54] SELENIUM ADSORPTION PROCESS

[75] Inventor: Russell Renk, Laramie, Wyo.

[73] Assignee: Western Research Institute, Laramie, Wyo.

[21] Appl. No.: 396,703

[22] Filed: Aug. 22, 1989

[51] Int. Cl.$^5$ ................................................ C02F 1/28
[52] U.S. Cl. ..................................... 210/684; 210/912
[58] Field of Search ............... 210/660, 679, 688, 911, 210/912, 683, 684

[56] References Cited

U.S. PATENT DOCUMENTS

| | | | |
|---|---|---|---|
| 3,970,553 | 7/1976 | Terajima et al. | 210/688 |
| 4,096,064 | 6/1978 | du Fresne | 210/120 |
| 4,116,705 | 9/1978 | Chappell | 210/751 |
| 4,405,464 | 9/1983 | Baldwin et al. | 210/717 |
| 4,519,913 | 5/1985 | Baldwin et al. | 210/611 |
| 4,530,765 | 7/1985 | Sabherwal | 210/688 |
| 4,725,357 | 2/1988 | Downing et al. | 210/611 |
| 4,790,945 | 12/1988 | Baker | 210/712 |
| 4,792,405 | 12/1988 | Baker | 210/721 |
| 4,839,052 | 6/1989 | Maree | 210/912 |

*Primary Examiner*—Ivars Cintins
*Attorney, Agent, or Firm*—Browdy and Neimark

[57] ABSTRACT

Selenium can be removed from wastewater by contacting the wastewater with an adsorbent which is fly ash, peat moss, or a mixture thereof. The treated wastewater can then be discharged to the ground, and the spent adsorbent can be used as landfill or to enrich soils which are depleted in selenium.

12 Claims, No Drawings

SELENIUM ADSORPTION PROCESS

FIELD OF THE INVENTION

The present invention is directed to a method for removing selenium from wastewater.

BACKGROUND OF THE INVENTION

Pollution and pollution control have become increasingly more important in recent years, not only because people are more sensitive to their environment, but also because the amount of pollution has increased markedly in some instances. Pollution represents a potential health hazard and a deterioration in the quality and beauty of our surroundings. It is one of the undesired consequences of our society's rising production, our modern civilization, and our increased use of natural resources.

Water is mankind's most valuable resource. Any use of water nearly always results in a decrease in the quality of the water by the addition of pollutants thereto. These pollutants can comprise dissolved inorganic and organic chemicals, inorganic and organic particulate material, and absorbed gases. In general, several methods are available for removing pollutants. These methods include such processes as gravity sedimentation, flotation, filtration, biological oxidation, ion exchange, activated adsorption, reverse osmosis, electrodialysis, distillation, and chemical precipitation. Several soluble inorganic pollutants present a problem that generally is not removed by gravity sedimentation, flotation, filtration, or biological oxidation.

Stringent standards for the maximum level of pollutants in water to be used for drinking or released into groundwater systems are being promulgaed by various federal and state agencies. For example, the maximum concentration level for selenium in drinking water has been set at less than 0.01 milligram per liter, and some jurisdictions have proposed a selenium standard of 0.05 milligrams per liter for discharge into the ground water system of the jurisdiction.

Another major problem with respect to pollution is agricultrual drainage water from areas such as the San Joaquin Valley. This Valley has approximately 1.1 million acres of extremely productive land under irrigation. The land is generally low-lying and requires drainage in order to avoid high salinity in crop root zones. Buried plastic pipe is commonly used to remove applied irrigation water from the root zone of filed crops. The resulting drainage water is high in selenium and therefore represents a serious disposal problem. Environmental concern has led to a suspension of construction work, a closure order on a large reservoir, and an extensive program of drain plugging. With the plugging of the drains, the water table is beginning to rise, causing concern for growers in the Valley.

Selenium is one of the heavy metals that is most difficult to remove from water. Although commercial elemental selenium is relatively inert, a number of selenium compounds, such as the reactive selenides, the gaseous, volatile, and soluble compounds, and particularly hydrogen selenide, the halides and oxyhalides, and the organics have been found to be particularly poisonous to humans and animals. These compounds can enter the body through the lungs, the skin, or through ingestion of polluted water, and may affect the body organs.

Selenium is primarily present in groundwater in the selenate ($SeO_4^=$) form, which is particularly hard to absorb on conventional adsorbents which are used to treat water for purification purposes. Therefore, when water is treated for removal of pollutants, often the selenium is not removed by the conventional treatments.

Methods are available for the purification of water, but in general the known methods are not suited for use on a large scale with brackish water containing selenium and a range of other contaminants. Reverse osmosis is costly, and so also is ion exchange. Since the initial aim in treating drainage water is to render it suitable for discharge, an economic process is required.

Terajima et al., U.S. Pat. No. 3,970,553, disclose a method for removing heavy metal ions such as selenium by using a heavy metal adsorbent composed predominantly of nitrohumic acid. The nitrohumic acid can be prepared by oxidation of coal with nitric acid.

Baker, in U.S. Pat. Nos. 4,790,945 and 4,792,405, discloses a method for removing hydrogen selenide from a liquid stream by treating the liquid with a disulfide or polysulfide to oxidize the selenide to elemental selenium.

Downing et al., in U.S. Pat. No. 4,725,357, disclose a method for removing dissolved selenium from water by treating the water in a reactor containing microbial biomass to cause the hexavalent selenium to be converted to forms of selenium which can be readily removed from the water.

DuFresne, in U.S. Pat. No. 4,096,064, discloses a system for removing toxic heavy metals such as selenium from drinking water by electrochemical replacement while the water flows through a tandem bed of activated zinc and then magnesium. The zinc is activated by contact with a noble metal salt.

Baldwin et al., in U.S. Pat. No. 4,405,464, disclose a process for removing selenium from aqueous systems by mixing the aqueous solution with a quantity of metallic iron to a lower oxidation state. The selenium ions are reduced to at least the Se(IV) oxidation state, and the dissolved metallic iron hydrolyzes to form an iron oxide that precipitates. The precipitated material is separated from the aqueous solution to provide a solution having a lower concentration of selenium ions. At least a portion of the selenium is eventually reduced to the elemental state, which can then be separated from the aqueous solution.

Baldwin et al., in U.S. Pat. No. 4,519,913, disclose a process for reducing the concentration of water soluble ionic selenium in aqueous waste water. The waste solution is passed through a treatment zone containing a porous matrix on which are retained populations of at least one bacterium of the genus Clostridium. The water soluble ionic selenium species is converted to water insoluble selenium metal, which is retained on a porous matrix from which it can be recovered.

Sabherwal, in U.S. Pat. No. 4,530,765, discloses a method for preparing particulate materials for treating wastewater by calcining a charge of clay mineral, feldspar, zeolite, coal ash, fly ash, pozzolan, or volcanic ash. Although there is a disclosure that heavy metals can be removed from wastewater using this material, there is no disclosure that selenium can be removed from wastewater by using this material.

None of the above patents discloses the use of an inexpensive material that quickly adsorb large amounts of selenium.

SUMMARY OF THE INVENTION

It is an object of the present invention to overcome the above-noted deficiencies in the prior art.

It is another object of the present invention to provide a method for removing selenium from wastewater economically.

It is a further object of the present invention to provide an adsorbent for wastewater that can be used to remove heavy metals therefrom.

According to the present invention, wastewater can be treated with fly ash, with peat moss, or with a mixture of the two, to remove selenium, or other heavy metals, which have chemistry similar to that of selenium. The adsorbents can then be landfilled, left in place at the bottom of a settling pond, or applied to land low in selenium.

The wastewater can be contacted with the adsorbent materials according to the present invention by mixing the wastewater with the adsorbent materials. After mixing, generally from about two to about 48 hours, the adsorptive materials are filtered out.

The fly ash can optionally be prewashed to stimulate absorption of selenium as well as to remove any impurities in the fly ash. An acid wash with for example, silicic acid, hydrofluoric acid, hydrochloric acid, sulfuric acid, or the like, can be used to stimulate selenium absorption by the fly ash. A wash with plain water can be used to remove impurities such as boron from the fly ash, and release the sites tied up by these impurities for selenium absorption. Washing the fly ash with a basic wash, such as aqueous sodium hydroxide, potassium hydroxide, or ammonium hydroxide, also removes impurities in the fly ash and improves the rate of absorption and capacity for absorption of selenium compounds.

The type of wash used depends on the type of coal used to make the fly ash, and the need for a prewash, as well as the type of prewash required, can readily be determined by one skilled in the art without undue experimentation.

DETAILED DESCRIPTION OF THE INVENTION

Selenium is removed from wastewater according to the present invention by contacting the wastewater with fly ash, peat moss, or a mixture thereof, to remove the selenium from the wastewater, generally by thorough mixing of the adsorbent(s) with the wastewater for a predetermined period of time. The adsorbent is then removed by filtration and the wastewater is discharged to the environment. The amount of peat moss and/or fly ash required to remove selenium from the water depends upon the initial selenium concentration, and can readily be determined by one skilled in the art.

The present invention will be understood more readily with reference to the following nonlimiting examples. However, these examples are intended merely to illustrate the invention, and are not to be construed as limiting the scope of the invention. In general, the fly ash and/or peat moss is used in quantities ranging from about 0.05 to 50 grams adsorbent/liter of water treated.

EXAMPLE 1

Fly ash I was generated from the burning of an eastern bituminous coal. Fly ash I in an amount of 20 grams/liter of water was mixed with untreated raw water, which had a selenium concentration of 95 µg/liter. After 24 hours of mixing, the fly ash I was filtered out, and the selenium levels remaining in the drainage water were determined. The selenium level in the water was 18 µg/liter.

EXAMPLE 2

Fly ash II was produced from the burning of a midwestern sub-bituminous coal. Fly ash II in an amount of 20 grams fly ash per liter of water was mixed with untreated raw water, which had a selenium concentration of 95 µg/liter. After 24 hours of mixing, the fly ash II was filtered out, and the selenium levels remaining in the drainage water were determined. The selenium level in the water was 8 µg/liter.

EXAMPLE 3

Peat moss obtained from a local garden supply shop was mixed for 18 hours in an amount of 20 grams peat moss per liter of water with a sample of drainage water which had a selenium concentration of 95 µg/liter. After the mixing, the peat moss was removed by filtration. The selenium level of the treated water was 51 µg/liter.

Table 1 shows the selenium levels in treated and untreated drainage water. The selenium was present primarily as selenate ($SeO_4^=$) in water with a total dissolved solids level of 9820 mg/liter and a sulfate ($SO_4^=$) level of 4730 mg/liter.

TABLE 1

| Drainage Water | Selenium Levels in Treated and Untreated Drainage Water | |
|---|---|---|
| | Selenium Concentration, µg/L | % Removal |
| Untreated, raw | 95 | |
| Treated with Fly Ash I | 18 | 81 |
| Treated with Fly Ash II | 8 | 92 |
| Treated with Peat Moss | 51 | 46 |

The above data illustrate that selenium can be removed by adsorption on fly ash and peat moss, or mixtures thereof. The spent fly ash and peat moss can then be applied to the land for disposal, or applied to land which is deficient in selenium.

For soil that needs conditioning, peat moss used according to the present invention is particularly advantageous.

EXAMPLE 4

Fly ash is generated from burning of midwestern sub-butaminous coal. The fly ash is prewashed with plain water for slurrying the fly ash with water and draining the fly ash. The fly ash is dried and mixed with equal amounts of peat moss.

The above mixture is mixed with water to be treated to remove selenium, and mixing is continued for 24 hours. The peat moss-fly ash mixture is removed from the mixture by draining.

EXAMPLE 5

Fly ash generated from burning of western coal is slurried with a 1% aqueous solution of hydrofluoric acid and drained. This pre-washed fly ash is then mixed with groundwater to be treated for selenium removal, and mixing is continued for eighteen hours. The fly ash is then removed from the treated water by draining.

EXAMPLE 6

Fly ash generated from burning of eastern bituminous coal is washed with 1% ammonium hydroxide solution by slurrying. The pre-washed fly ash is then mixed with groundwater to be treated for removal of selenium, and mixing is continued for 30 hours. The fly ash is then removed from the treated water by draining.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A process for removing selenium from wastewater consisting essentially of contacting said wastewater with an adsorbent selected from the group consisting of fly ash, peat moss, and mixtures thereof to form a mixture of wastewater and adsorbent for a time sufficient to adsorb selenium from the wastewater, and removing the adsorbent containing selenium from the mixture of wastewater and adsorbent.

2. The process according to claim 1 wherein the adsorbent is fly ash.

3. The process according to claim 1 wherein the adsorbent is peat moss.

4. The process according to claim 1 wherein the adsorbent is a mixture of peat moss and fly ash.

5. The process according to claim 1 wherein the wastewater is contacted with the adsorbent for a period ranging from about two hours to about 48 hours.

6. The process according to claim 1 wherein the selenium is present in the wastewater primarily in the form of selenate ($SeO_4^=$).

7. The process according to claim 1 wherein the fly ash is prewashed.

8. The process according to claim 7 wherein the prewash is with a liquid selected from the group consisting of aqueous acid, water, and aqueous base.

9. The process according to claim 8 wherein the prewash is with hydrofluoric acid.

10. The process according to claim 8 wherein the prewash is with silicic acid.

11. The process according to claim 8 wherein the prewash is with water.

12. The process according to claim 8 wherein the prewash is with ammonium hydroxide.

* * * * *